(12) United States Patent
Baumann (10) Patent No.: US 9,764,909 B2
(45) Date of Patent: Sep. 19, 2017

(54) DEVICE AND METHOD FOR QUICKLY GROUPING PICKED GOODS FOR TRANSPORT

(75) Inventor: Michael Baumann, Unterfoehring (DE)

(73) Assignee: Grenzebach Maschinenbau GmbH, Asbach-Baeumenhei (DE)

( * ) Notice: Subject to any disclaimer, the term of this patent is extended or adjusted under 35 U.S.C. 154(b) by 585 days.

(21) Appl. No.: 13/882,311

(22) PCT Filed: Oct. 26, 2011

(86) PCT No.: PCT/DE2011/001899
§ 371 (c)(1),
(2), (4) Date: Apr. 29, 2013

(87) PCT Pub. No.: WO2012/062273
PCT Pub. Date: May 18, 2012

(65) Prior Publication Data
US 2013/0212982 A1  Aug. 22, 2013

(30) Foreign Application Priority Data
Nov. 5, 2010 (DE) .......................... 10 2010 050 607

(51) Int. Cl.
*B65G 57/24* (2006.01)
*B65B 35/50* (2006.01)
(Continued)

(52) U.S. Cl.
CPC .............. *B65G 57/24* (2013.01); *B65B 11/02* (2013.01); *B65B 35/50* (2013.01); *B65G 1/1378* (2013.01);
(Continued)

(58) Field of Classification Search
CPC ...... B65G 57/24; B65G 1/1378; B65G 57/06; B65G 57/245; B65B 11/02; B65B 35/50
See application file for complete search history.

(56) References Cited

U.S. PATENT DOCUMENTS 2,066,449 A * 1/1937 Barrett ................... B65B 11/02
53/218
2,149,400 A * 3/1939 Mazer ..................... B65B 11/02
53/207
(Continued)

FOREIGN PATENT DOCUMENTS

CA    2360068 A1 *  7/2000  ........... B65G 47/086
CA    2415175 A1 *  2/2002  ............. B65G 57/24
(Continued)

*Primary Examiner* — Hemant M Desai
*Assistant Examiner* — Lucas Palmer
(74) *Attorney, Agent, or Firm* — Walter | Haverfield LLP; D. Peter Hochberg; Sean F. Mellino (57) ABSTRACT

A device for quickly grouping picked goods for transport. The device includes a pair of stacking bridges lying opposite each other for pushing goods containers together in a defined manner to form a layer. The stacking bridges include a plurality of parallel, finger-like conveyor belts. The goods containers are pushed together in the direction of the diagonals of their base surfaces. A lifting apparatus is provided for lowering a layer of goods containers and placing a layer onto an empty pallet. A film-wrapping apparatus is provided for wrapping a shipment of picked goods prepared for transport.

4 Claims, 9 Drawing Sheets

(51) Int. Cl.
  *B65B 11/02* (2006.01)
  *B65G 1/137* (2006.01)
  *B65G 57/06* (2006.01)
(52) U.S. Cl.
  CPC ........... *B65G 57/06* (2013.01); *B65G 57/245* (2013.01); *B65B 11/025* (2013.01)

(56) References Cited

U.S. PATENT DOCUMENTS

| | | | | |
|---|---|---|---|---|
| 2,560,405 A * | 7/1951 | Back | B65B 11/02 | 493/174 |
| 2,605,598 A * | 8/1952 | MacKenzie | B65B 11/02 | 53/207 |
| 2,624,990 A * | 1/1953 | Allen | B65B 11/02 | 53/147 |
| 3,303,942 A * | 2/1967 | Thomas | B65G 57/245 | 414/791.4 |
| 3,351,216 A * | 11/1967 | Thomas | B65G 57/245 | 414/791.4 |
| 3,495,375 A * | 2/1970 | Burhop | B65B 51/14 | 206/499 |
| 3,596,776 A * | 8/1971 | Melin | B65G 57/00 | 414/620 |
| 3,685,253 A * | 8/1972 | Herrell | B65B 11/02 | 53/218 |
| 3,870,356 A * | 3/1975 | Meads | B66C 1/24 | 294/67.2 |
| 4,030,618 A * | 6/1977 | Kelley | B65G 57/245 | 193/35 A |
| 4,712,975 A * | 12/1987 | Salts | B65G 57/035 | 100/264 |
| 4,765,487 A * | 8/1988 | Bliss | B65G 57/24 | 209/510 |
| 4,809,965 A * | 3/1989 | Vander Meer | B65G 57/005 | 271/107 |
| 4,993,907 A * | 2/1991 | Clark | B65H 31/3054 | 198/374 |
| 5,437,534 A * | 8/1995 | Gales | B23Q 7/02 | 198/457.07 |
| 5,533,861 A * | 7/1996 | Klupfel | B65B 35/40 | 198/468.6 |
| 5,701,722 A * | 12/1997 | Franklin | B65B 11/025 | 53/399 |
| 5,716,189 A * | 2/1998 | Winski | B65G 57/245 | 414/799 |
| 6,129,504 A * | 10/2000 | Gammerler | B65H 31/30 | 414/792.9 |
| 6,279,295 B1 * | 8/2001 | Girard | B65B 11/02 | 53/389.3 |
| 6,371,720 B1 * | 4/2002 | Ouellette | B65G 57/005 | 414/791.6 |
| 6,402,455 B1 * | 6/2002 | Vincent | B65G 57/005 | 271/91 |
| 6,658,816 B1 * | 12/2003 | Parker | B65G 57/005 | 414/2 |
| 6,871,893 B2 * | 3/2005 | Langston | B65G 61/00 | 294/113 |
| 7,643,901 B2 * | 1/2010 | Ponti | B65G 47/086 | 700/217 |
| 7,802,959 B2 * | 9/2010 | Pierson | B65G 47/086 | 414/789.5 |
| 8,342,790 B2 * | 1/2013 | Schaferling | B65G 57/24 | 414/794.3 |
| 2005/0056521 A1 * | 3/2005 | Keyes | B65G 57/26 | 198/418.5 |
| 2006/0125653 A1 * | 6/2006 | McQuade | B65B 11/02 | 340/870.07 |
| 2007/0262001 A1 * | 11/2007 | Hansen | B07C 5/10 | 209/580 |
| 2007/0272515 A1 * | 11/2007 | Yohe | B65G 47/90 | 198/443 |
| 2008/0008573 A1 * | 1/2008 | Mitchell | B65G 61/00 | 414/791.6 |
| 2008/0260513 A1 * | 10/2008 | Lalesse | B65G 57/26 | 414/791.8 |
| 2010/0025516 A1 * | 2/2010 | Barsacchi | B25J 15/0616 | 242/533.2 |
| 2010/0198394 A1 * | 8/2010 | Trygg | B65G 57/24 | 700/218 |
| 2010/0284775 A1 * | 11/2010 | Germain | B65G 57/24 | 414/791.6 |
| 2010/0326018 A1 * | 12/2010 | Perreault | B65B 11/02 | 53/461 |
| 2011/0076128 A1 * | 3/2011 | Johnsen | B65G 21/14 | 414/791.6 |
| 2011/0276174 A1 * | 11/2011 | Bolzani | B65G 47/086 | 700/217 |
| 2011/0277423 A1 * | 11/2011 | Magri | B65G 57/035 | 53/443 |
| 2012/0039699 A1 * | 2/2012 | Ward | B25J 15/0052 | 414/792.7 |
| 2013/0177380 A1 * | 7/2013 | Murarotto | B65G 47/90 | 414/796.2 |
| 2014/0174885 A1 * | 6/2014 | Cavelius | B65G 57/035 | 198/418.9 |
| 2015/0151931 A1 * | 6/2015 | Cavelius | B65G 57/035 | 414/792.8 |
| 2015/0246444 A1 * | 9/2015 | Guidi | B65G 57/24 | 414/729 |
| 2015/0307294 A1 * | 10/2015 | Kolker | B65G 57/24 | 414/792 |

FOREIGN PATENT DOCUMENTS

| | | | | |
|---|---|---|---|---|
| DE | EP 0218833 A2 * | 4/1987 | | B65G 57/035 |
| DE | 103 56 563 A1 | 6/2005 | | |
| DE | WO 2010086140 A1 * | 8/2010 | | B65B 11/585 |
| DE | EP 2444325 A1 * | 4/2012 | | B43M 5/04 |
| DE | 102012204030 A1 * | 9/2013 | | B65G 47/841 |
| EP | 0 218 833 A2 | 4/1987 | | |
| EP | 0 816 272 A1 | 1/1998 | | |
| EP | 1 986 941 B1 | 12/2000 | | |
| EP | 1 783 072 A1 | 5/2007 | | |
| EP | 1 783 072 B1 | 5/2007 | | |
| ES | EP 1319594 A2 * | 6/2003 | | B65B 11/02 |
| FR | 1031872 A * | 6/1953 | | B65B 11/02 |
| FR | 1201266 A * | 12/1959 | | B65B 11/02 |
| FR | WO 2007093694 A2 * | 8/2007 | | B65G 47/086 |
| FR | 2976273 A1 * | 12/2012 | | B65G 57/24 |
| GB | 693492 A * | 7/1953 | | B65B 11/02 |
| JP | 08 012012 | 1/1996 | | |
| KR | WO 2006065090 A1 * | 6/2006 | | B65G 47/90 |
| NL | 1 025 826 C2 | 10/2005 | | |
| NL | WO 2010047595 A1 * | 4/2010 | | B65G 47/90 |
| WO | WO 01/68330 | 9/2001 | | |
| WO | WO 2006/065090 A1 | 6/2006 | | |
| WO | WO 2007/093774 A1 | 8/2007 | | |
| WO | WO 2008/008202 A2 | 1/2008 | | |
| WO | WO 2009/150684 A1 | 12/2009 | | |
| WO | WO 2010/047595 | 4/2010 | | |
| WO | WO 2012027705 A3 * | 4/2012 | | B65B 9/135 |

* cited by examiner

DEVICE AND METHOD FOR QUICKLY GROUPING PICKED GOODS FOR TRANSPORT

CROSS-REFERENCE TO RELATED APPLICATIONS

This application is a National Stage application of International Application No. PCT/DE2011/001899, filed on Oct. 26, 2011, which claims priority of German application Serial Number 10 2010 050 607.9, filed on Nov. 5, 2010, both of which are incorporated herein by reference in their entireties.

BACKGROUND OF THE INVENTION

Field of the Invention

The present invention relates to a device and to a method for quickly grouping picked goods for transport.

Description of the Prior Art

In a plurality of business areas, for example trade with foodstuffs, in particular beverages, dairy products, semi-luxury foods and tobacco, replacement parts and accessories as well as industrial and domestic products, goods are present in unmixed source pallets with identical-type containers, for example crates of identical flavor beverages or trays of identical flavor yoghurts. Mixed target pallets which, depending on the order, include diverse containers which differ in type, size or other parameters, are grouped from the above.

Usually, in this case, an unmixed source pallet is initially singled out in full and its containers are stored in an ordered manner in specific buffers. In this respect, there is the disadvantage that very large buffers have to be provided in order to be able to accommodate all the containers of an unmixed source pallet. Since, for mixed palletization, at least one buffer has to be prepared for each sort of container, such units are not only inflexible but also require a large amount of space.

To group picked goods, goods containers with a plurality of mixed containers are, in turn, to be grouped.

The following devices, among others, have been made known for grouping goods.

WO 2006/065090 A1 makes known a device for storing sheet materials and the unloading thereof, said device has a movable frame with a plurality of holders which lie side by side and move along an X-axis. Said holders are moved vertically by a lift and serve to accommodate the sheet materials.

EP 1 986 941 B1 relates to a pick-and-place apparatus for picking up and repositioning an article carried by a supporting surface. For this purpose, said apparatus includes a first part which has a plate section which is movable parallel to the supporting surface such that a front edge thereof penetrates under the article, between the article and the supporting surface. In addition, said apparatus includes a belt of flexible material which is wound about at least the front edge of the plate section such that it penetrates between the plate and the article when the plate is underneath.

WO 2010/047595 A1 describes an apparatus for stacking products on pallets or roll containers, by way of which products of different geometric dimensions and development are able to be gripped. Said apparatus essentially includes a gripper which is able to be moved between a supplying surface and a loading surface accommodating the product, the gripper having a series of horizontally mounted forks which are arranged in parallel and are pushed under the product in an individually controlled manner.

SUMMARY OF THE PRESENT INVENTION

Consequently, the object underlying the method as claimed in the invention or the corresponding device is to provide a device and a method by way of which picked goods are able to be quickly grouped and prepared for transport.

Said object is achieved with a device according to the presently claimed invention, or a method according to the presently claimed invention.

BRIEF DESCRIPTION OF THE DRAWINGS

The device as claimed in the invention is described more closely below, in which, in detail:

DETAILED DESCRIPTION OF THE PRESENT INVENTION

The essential novelty of the present invention consists in that the containers, which are to be grouped in one layer, are pushed together in a particular manner such that a bond is produced which leaves a minimum of space between the containers. Such a layer, formed from several containers, is consequently relatively solidly joined and consequently forms a good, secure base for the following layer and, all in all, for a shipment of picked goods formed from several layers.

In addition, a particular arrangement of sensors ensures quick detection of the individual dimensions and packing parameters of the containers and consequently a quick cycle time for the grouping of a certain shipment.

Figure 1:
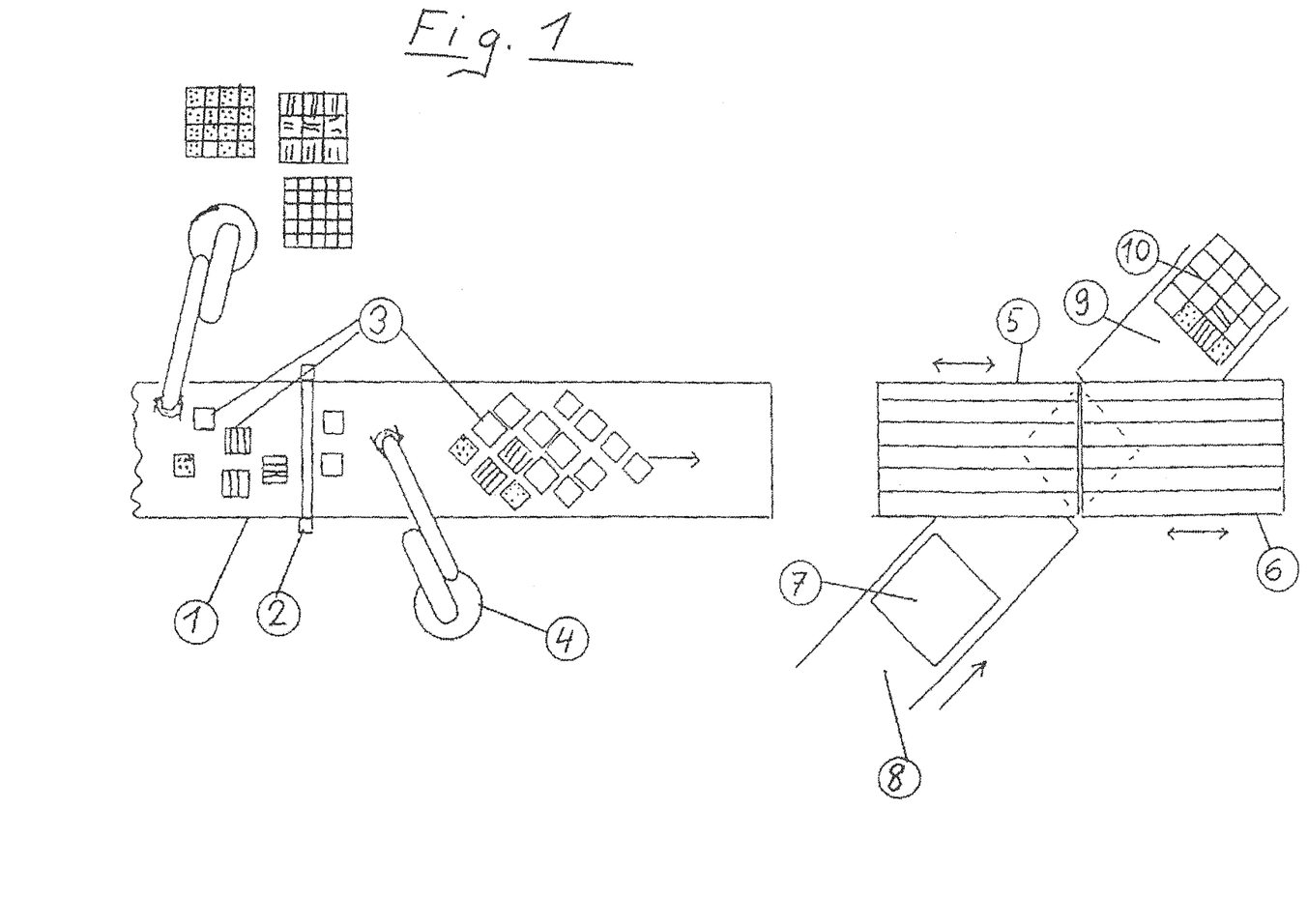
FIG. 1 shows a top view of a representation of the device as claimed in the invention

FIG. 1 shows a top view of a representation of the device as claimed in the invention. A conveyor belt 1 is shown schematically on the left-hand half, said conveyor belt serving for pre-sorting and aligning the goods containers 3 which are subsequently grouped in a goods shipment. By means of the detecting apparatus 2, the principal dimensions of the goods containers 3, such as the geometric dimensions and weight, are determined at said position. For this purpose, not only can said geometric dimensions of the goods container 3 be detected in top view by means of the detecting apparatus 2, but its height profile can also be detected by means of a further apparatus, not visible in this case. By means of further apparatuses, not shown here either, for example scales incorporated in the conveyor belt, it is possible to determine the weight of each goods container 3. The work of the pre-sorting process, which is necessary in this regard, is performed by means of a sorting robot 4. Sorting robot 4, once a goods container 3 has been grasped, can also determine the weight thereof itself by means of a built-in apparatus for measuring weight.

The sorting work is able to be effected automatically by means of the sorting robot, patterns of typical dimensions and weights of frequently occurring types of goods containers 3 established using control techniques, in each case according to the type of trade, being determined in preliminary tests to accelerate the data processing (pattern recognition). Connected upstream of the pre-sorting process is a further sorting robot without designation which removes the desired goods containers 3 in each case from other goods containers to group the picked goods individually. Said other goods containers can be unmixed or can even also have a mixed make-up.

Additional detecting apparatuses 2 which monitor the result of the pre-sorting process, if necessary more than once, can be provided as a further development of the invention.

Stacking bridges are required for grouping the goods containers. The right-hand half of FIG. 1 shows in each case a left-hand stacking bridge 5 and a right-hand stacking bridge 6. The gap between the left-hand stacking bridge 5 and the conveyor belt 1, shown here for reasons of clarity, is easily bridgeable in practice. It can be bridged without any problem by means of the left-hand stacking bridge 5. The supplying of empty pallets 7 is effected on the supplying means 8, e.g. a moving belt. The conveying path 9 serves for continuing to guide made-up pallets 10. The right-hand stacking bridge 6, in each case according to requirements, can also be supplied by a conveyor belt 1 (cf. FIG. 6).

Figure 2:
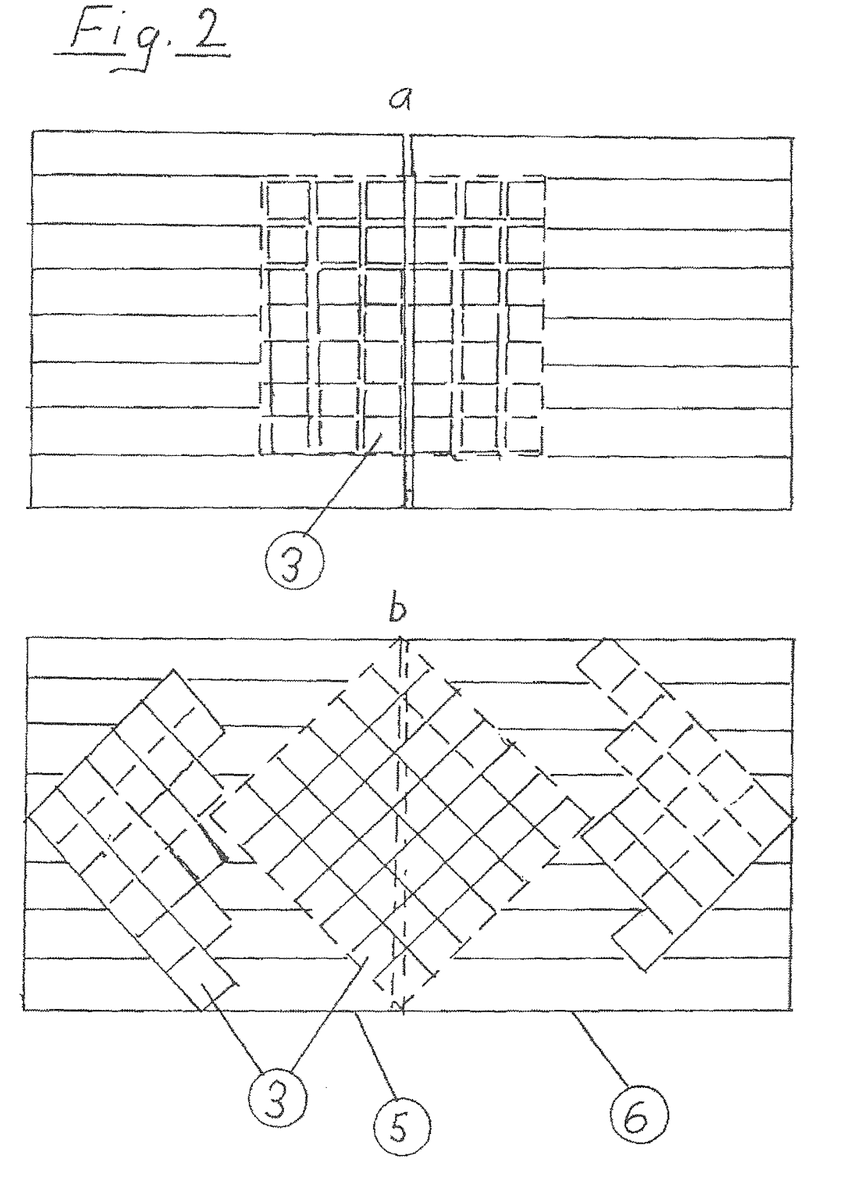
FIG. 2 shows a representation of the method of packing as claimed in the invention

FIG. 2 shows a schematic representation of the method of packing as claimed in the invention. The conventional manner of grouping goods containers 3 is shown, in this respect, in the top FIG. 2a.

In this case, the individual goods containers 3, shown in the simplified form of, for instance, square surfaces, are grouped such that their longitudinal sides, or transverse sides, are aligned parallel or transversely with respect to the longitudinal sides of the stacking bridges 5, 6. Said grouping is effected by means of conveyor belts which, when viewed from above, can be seen as strip-shaped surfaces and which push the goods containers 3 toward one another in the direction of the longitudinal axes of the two stacking bridges. This type of grouping describes the prior art.

Contrary to this, the goods containers 3 are pushed together as claimed in the invention according to FIG. 2b such that the diagonals of their base surfaces extend substantially parallel to the longitudinal axes of the conveyor belts. In this way, it is ensured that the force, which the conveyor belts of the two stacking bridges 5, 6 to be moved toward one another exert on the totality of the goods containers 3 in the longitudinal axis, is divided into two force components such that it presses the totality of the accumulation of goods containers 3 fixedly together in the centripetal direction.

Figure 3:
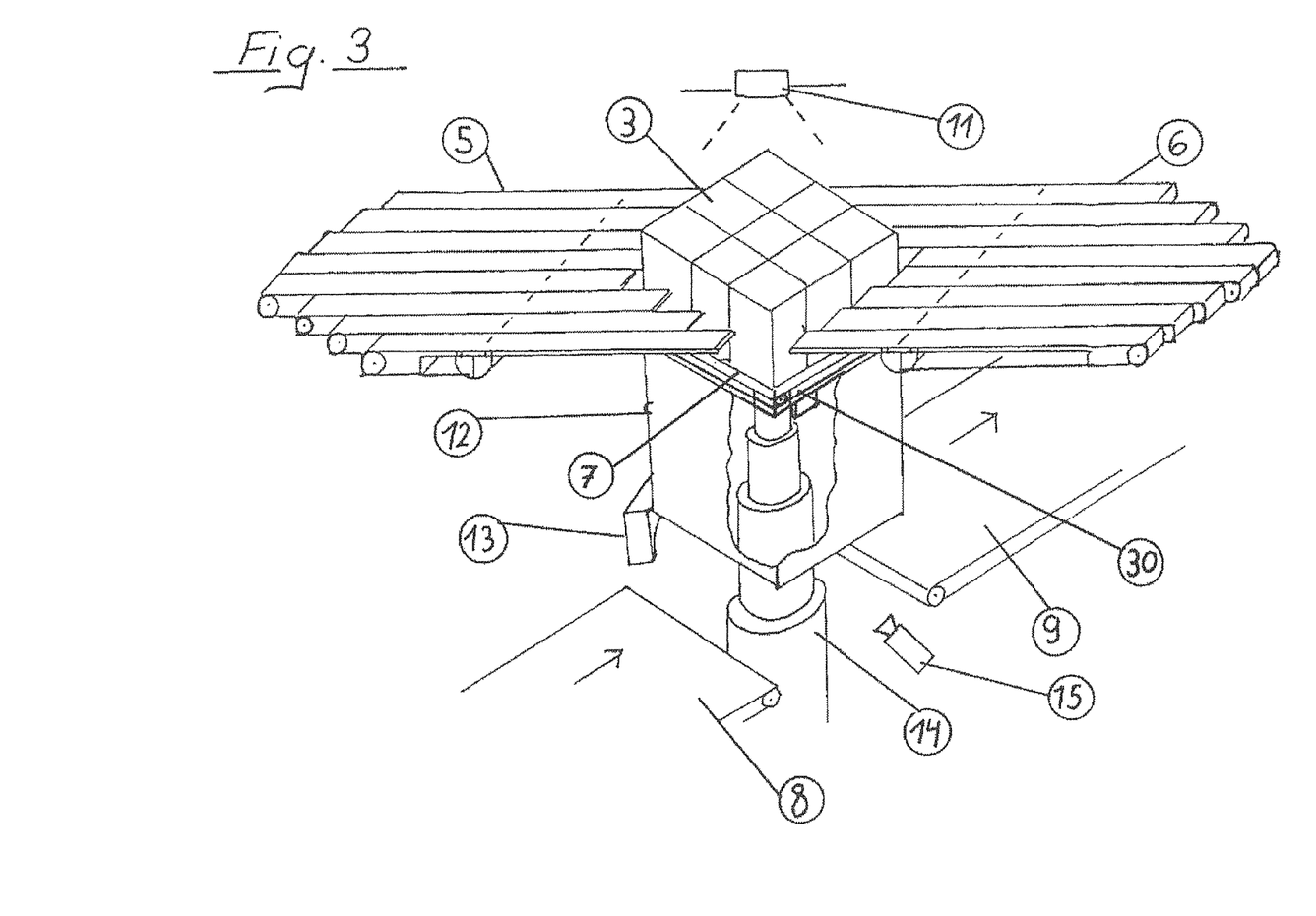
FIG. 3 shows a perspective representation of the method of packing as claimed in the invention

FIG. 3 shows a perspective representation of the method of packing as claimed in the invention. A left-hand stacking bridge 5 and a right-hand stacking bridge 6 can be seen in said FIG. 3, the conveyor belts of which, corresponding to the totality of the goods containers 3, arranged at an angle of 45 degrees with respect to their longitudinal direction, are extended at different lengths. The moment at which the totality of said layer of goods containers 3, in this case simplified as 9 cube-shaped containers 3, is lowered into a stacking shaft 12 by means of a lifting apparatus 14 for pallets, is fixed in said representation.

Said lifting apparatus 14 has a lifting base 30 which consists essentially of one or several conveyor belts with their own drive.

In the case of one particular development of the lifting base 30 with at least 2 conveyor belts running in parallel, each with a separate drive, there is the additional possibility of correcting the conveyed goods located thereon in the direction of running. This is simply effected by just one of the at least 2 conveyor belts running quicker or slower than the other one.

In this way, in normal operation, the empty pallet 7 shown in FIG. 3 moves from its supplying means or apparatus 8 onto the lifting base 30. The lifting base 30 takes care of the continued conveying of the ready made-up pallet along the conveying path 9.

Said operation is observed and controlled by at least one apparatus 11 which serves for detecting and scanning the goods containers. A plurality of apparatuses 11 are movable horizontally in two axes, which stand at right angles with respect to one another, in the region of the lifting apparatus 14 and of the two stacking bridges 5, 6. To obtain data which serves the overview or requires knowledge of the details of the respective goods container layer, in each case one apparatus 11 is additionally also movable in a vertical manner. The results of the various apparatuses 11 complement one another as, in each case, the focus of one apparatus 11 is able to overlap with the focus of the adjacent apparatus 11. In this way, it is possible to obtain additional data which can be used for the overall control of the device as claimed in the invention. In each case, it is also possible for 2 adjacent apparatuses 11 to be controlled in a targeted manner such that special information with respect to a goods container 3 can be obtained from their different angles of observance. More details in this respect can be found in FIG. 3a.

The supplying means or apparatus 8 for empty pallets and the conveying path 9 for made-up pallets are shown extending diagonally below the stacking shaft 12. Once all the container layers of a shipment of picked goods are grouped, the entire shipment can be wrapped by means of a film wrapping apparatus 13, shown here in a schematic manner. A scanning apparatus 15 serves for checking this operation.

Figure 3A:
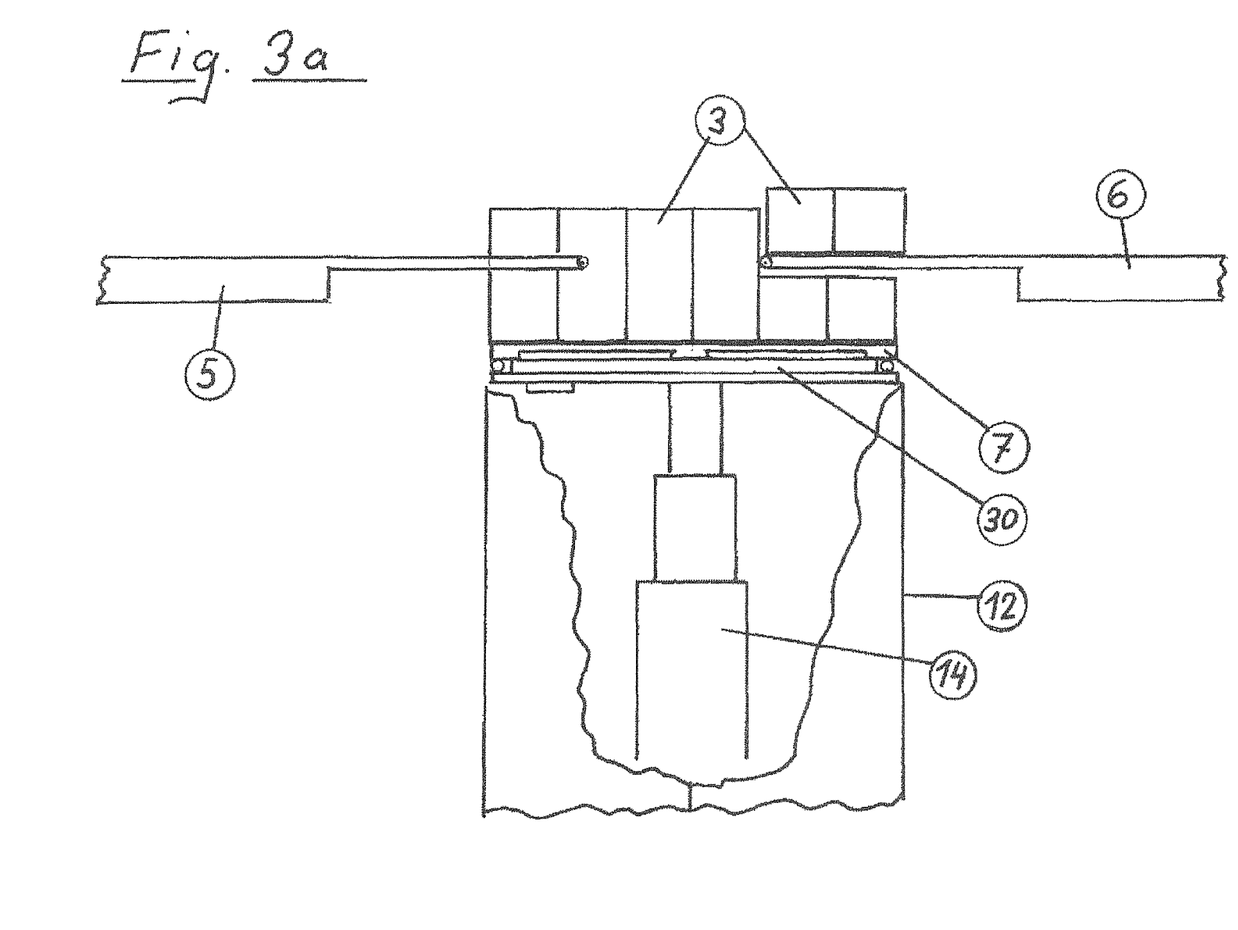
FIG. 3a shows a representation supplementing FIG. 3

FIG. 3a supplies a supplementary representation to FIG. 3. This Figure shows a perspective view as in FIG. 3 of the left-hand stacking bridge 5 and the right-hand stacking bridge 6 in conjunction with a layer of goods containers 3, seen from the side. In this way, it becomes clear how such a layer, as a result of information on the geometric dimensions of the goods containers 3, as is obtained according to FIG. 1, the left-hand half, is grouped using control techniques such that the top covering surface of such a layer forms as secure a base as possible for the layer following thereafter. For example, FIG. 3a shows in an idealized manner how, by means of the conveyor belts, high and low goods containers 3 can be grouped in one layer by the stacking bridges (5, 6). In addition, in the case shown, the top layer of the lower goods containers 3, once placed on the corresponding bottom layer, is pressed in a sealing and almost seamless manner against the remaining goods containers 3 by means of the diagonal position of the lifting apparatus 14. The lifting base 30 and the lifting apparatus 14 can be seen under the empty pallet 7. The stacking shaft 12 forms the outer boundary for the individual layers of the goods containers 3.

The example shown here is simplified. In practice, the control of the unit is programmed such that along with observing the respective base surfaces, the heights of the individual goods containers 3 are grouped such that as level a surface as possible is produced as the base for the next layer. The heights of the individual goods containers 3 consequently are available to the control means or apparatus of the unit as a type of "terrain model of the top covering surfaces of the goods containers" as an information base. In addition, where the optimum placing of the goods containers of an order pick in one layer, or in the totality of the layers, is determined in a computer-oriented manner, the weight of the individual goods containers is also taken in account along with the geometric dimensions.

In a particular development of the invention, it can be provided that all of the goods containers or only a particular proportion of the goods containers is characterized by means of an identification, for example a bar code. This can be necessary, for example, if part of the goods containers is particularly sensitive or easily breakable and requires particular handling. In such a case, said coding does require additional expenditure, but said expenditure on programming can be worth it.

Figure 4:
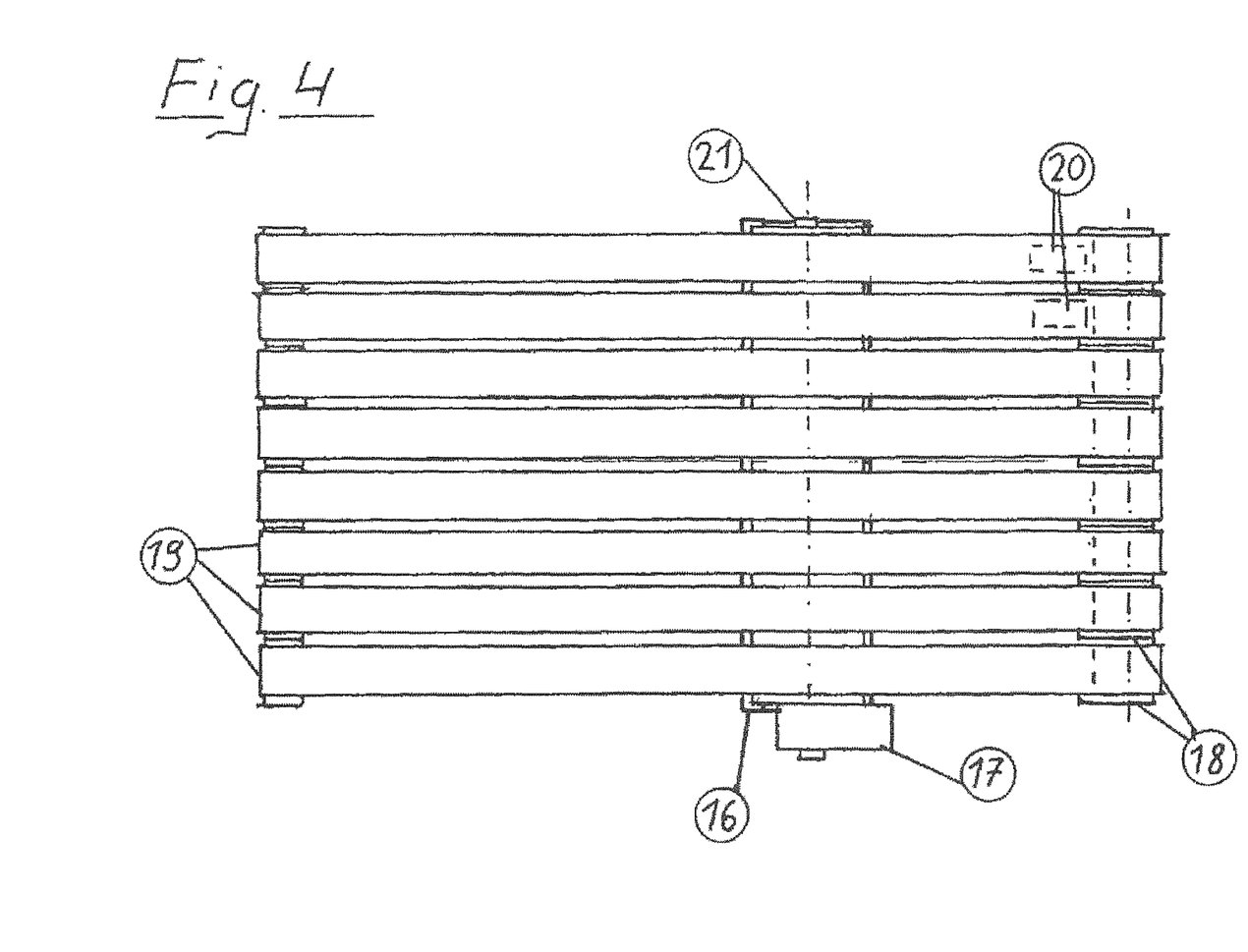
FIG. 4 shows a top view of an arrangement of conveyor belts

FIG. 4 shows a top view of an arrangement of conveyor belts as an essential part of a stacking bridge. In this case, 8 conveyor belts 19 with one common holder 16 which connects all the conveyor belts 19 are shown as an example. At the same time, the holder 16 provides the base of the respective stacking bridge 5, 6. The method of operation of a stacking bridge 5, 6 is determined, in the main, by the respective primary drive 17 and the individual secondary drive 20 of each of their individual conveyor belts 19. The primary drive 17 is effected in this respect for all conveyor belts of the respective stacking bridge in common by means of the drive shaft 21. In FIG. 4, the secondary drives 20 are shown for each of the top 2 conveyor belts 19 and the holders 18 of the drive for the secondary drive are shown for each of the bottom 2 conveyor belts. The outlines of the vertical lifting carriage 34, which will be described in more detail in the description of FIG. 5, are indicated in the region of the holder 16.

Figure 5:
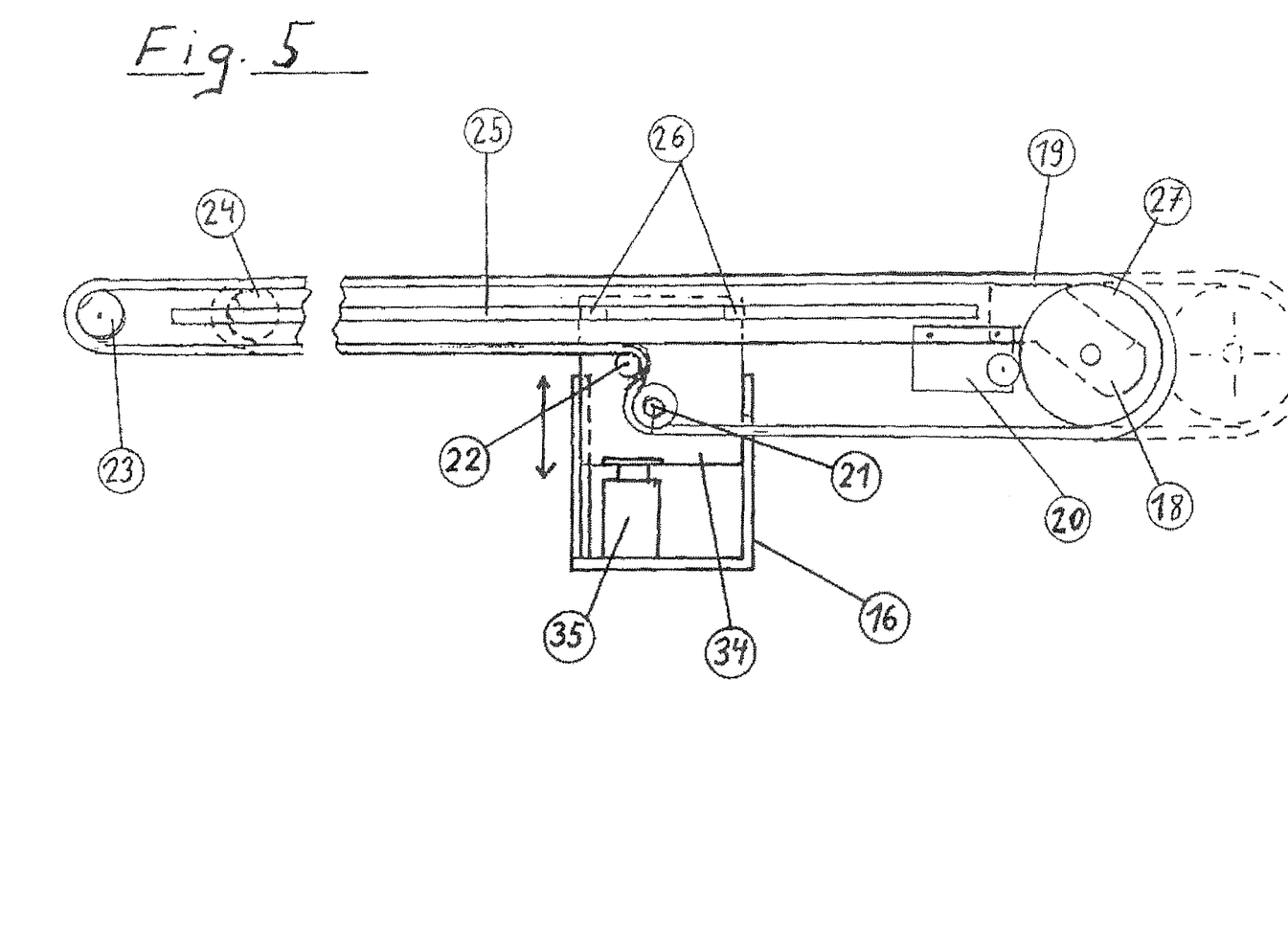
FIG. 5 shows a side view of a conveyor belt guiding means or apparatus

The side view of a conveyor belt guiding means or apparatus can be seen in FIG. 5, from which the method of operation of a conveyor belt 19 becomes clear.

The actual conveyor belt 19 is an endless loop, which, driven by the drive axle 21 of the primary drive and guided by means of a guide roller 22, leads back to the drive axle 21 by means of a front guide roller 23 and a drive wheel 27 of the secondary drive 20 mounted by means of a holder 18. The conveyor belt 19, in this respect, is guided by a tongue-shaped mount 24 which, as indicated by the sketch in FIG. 5, has a certain, but expedient length. Said mount 24 is guided by means of its guide groove 25 and the slide blocks 26 are guided in the holder 16 and are at the same time defined with respect to the end points of their mobility. The diameter of the drive wheel which is driven by the drive axle 21 of the primary drive is at a certain ratio to the diameter of the drive wheel 27 which is driven by means of the secondary drive 20.

If the speeds of said two drive wheels correspond to the various diameters in the reverse ratio, the conveyor belt is moved in an even manner and the mount 24 consequently remains in the respective position assumed prior to said state.

This is changed if the speeds of the primary drive 17 or of the secondary drive 20 change in relation to the state described previously. The mount 24 is lengthened or shortened in this way by one of the slide blocks 26 as far up as the respective stop. Consequently, by controlling the speeds of the primary drive and the secondary drive not only can a conveyor belt 19 be driven but also the effective length of its mount 24 can be changed at the same time.

It is pointed out that the conveyor belts 19 are able to move forward and backward to carry out their conveying tasks.

In one particular development of the invention, the primary drive 17 of the conveyor belts 19 is identical not only for all conveyor belts of a stacking bridge, but, in addition, in each case each conveyor belt is provided with its own primary drive which can be actuated in place of the common primary drive. In addition, it can be provided that the position of each conveyor belt 19 is modifiable separately in a controlled manner in the vertical direction by means of its own vertical lifting carriage 34 and its drive 35. Together with the characteristic of the conveyor belts 19 to be able to move forward or backward, it is consequently possible for the goods containers 3 to be displaced individually by one of the conveyor belts 19 to any desired height within the framework of a certain lifting region, or even to be tilted somewhat or to be moved by way of the effect of a certain torque. Individual goods containers 3 can be displaced additionally in a targeted manner in this way.

The monitoring of the speeds of the individual drives and the change in length, or the absolute length, of each mount is effected by means of sensors. Said sensors are not shown for reasons of clarity of representation. The output signals of said sensors supply decisive operating parameters for the control of the device as claimed in the invention.

Figure 6:
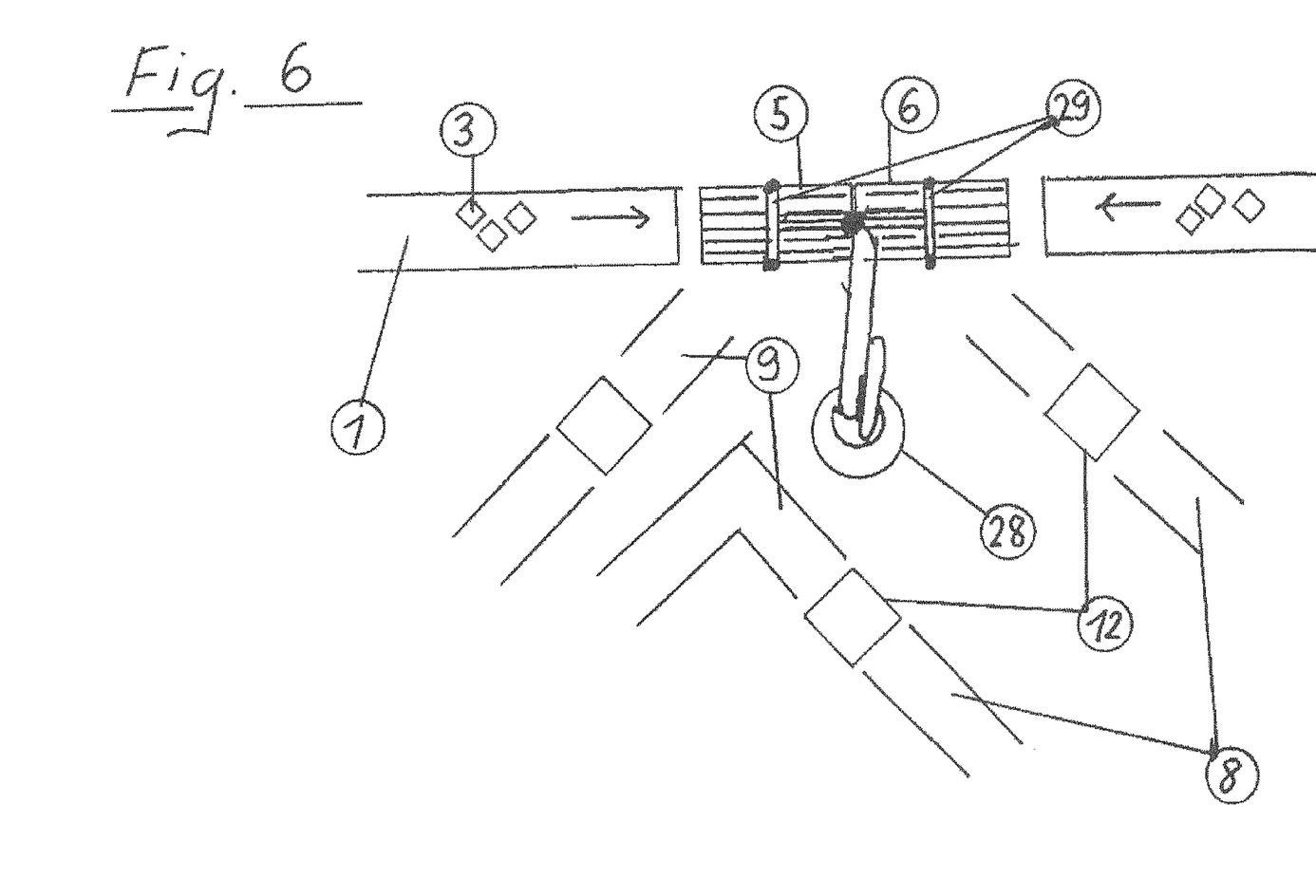
FIG. 6 shows a top view of a distributing center as claimed in the invention

FIG. 6 shows a top view of a distributing center which is provided with the method of packing as claimed in the invention.

A conveyor belt 1 for pre-sorting and aligning goods containers 3 can be seen here on the left-hand side and a corresponding conveyor belt which corresponds to said conveyor belt 1 can be seen on the right-hand side. Both conveyor belts correspond to the standard explained in FIG. 1.

In the middle of said distributing center there is a pivoting apparatus 28 which, by means of a bridge gate 29 which provides the function of an auxiliary conveying means or apparatus, is capable of conveying in each case one left-hand and one right-hand stacking bridge together to one of the stacking shafts 12, which is shown as an example. In each case empty pallets 7 are supplied to said stacking shafts 12 by means of a supplying means or apparatus 8 and made-up pallets 10 are also removed from said stacking shafts by means of a conveying path 9.

Figure 7:
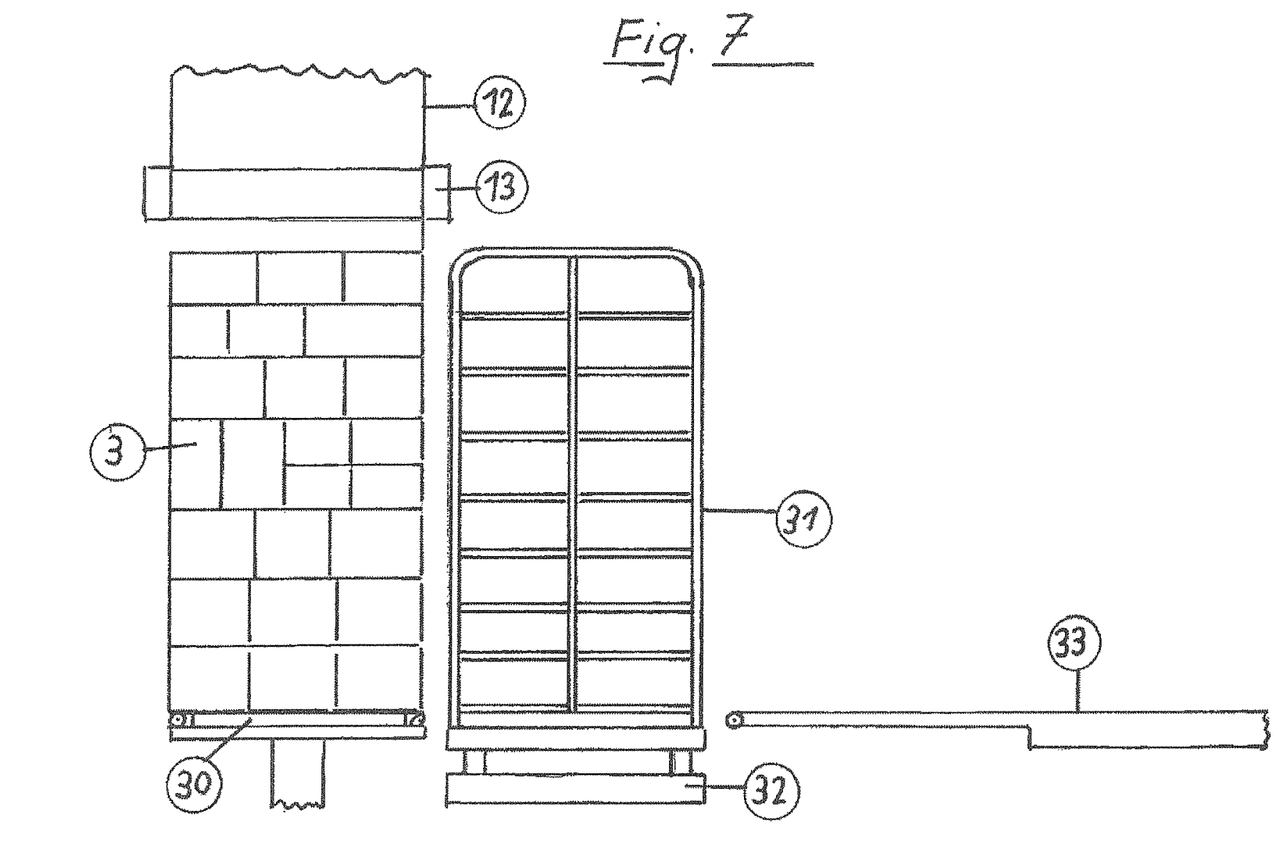
FIG. 7 shows a representation of the filling process with an alternative method of conveying

FIG. 7 shows a representation of the filling of an empty pallet by means of a different method of further conveying. Such a pallet 31 with two lattice walls is also filled by way of the device as claimed in the invention, but the grouped picked goods are displaced onto a pallet 31 with two lattice walls by means of the lifting base 30 and a stacking bridge 33. Said pallet 31 is then conveyed further by means of a special conveyor belt 32.

Figure 7A:
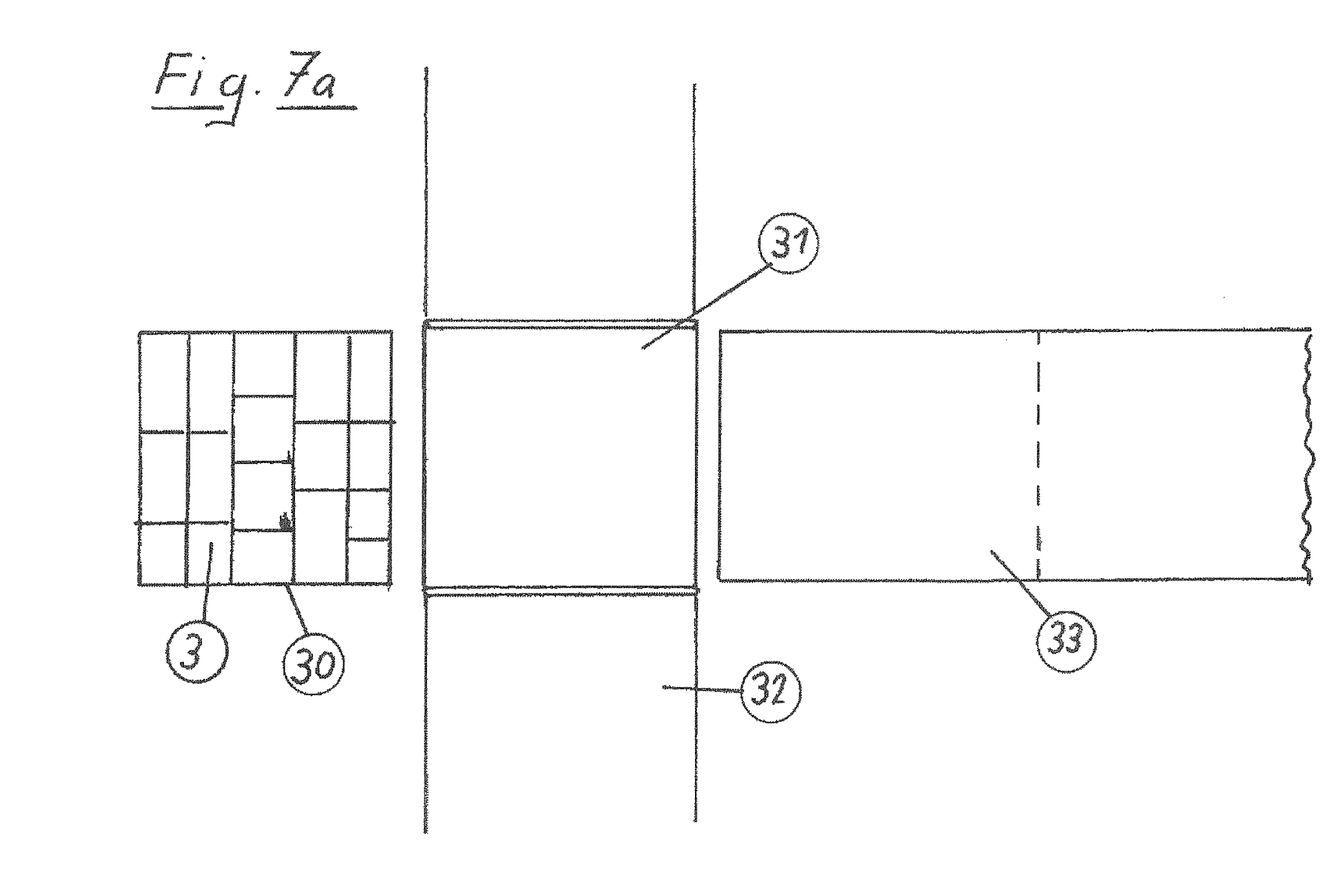
FIG. 7a shows a representation supplementing FIG. 7.

FIG. 7a shows a top view of this operation.

The control of the complex movement operations and the signal processing of the sensors used requires a special control program.

What has been described above are preferred aspects of the present invention. It is of course not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, combinations, modifications, and variations that fall within the spirit and scope of the appended claims.

I claim:

1. A method for quickly grouping picked goods for transport, wherein said method uses a system comprising a conveying unit and a stacking unit for stacking the individual containers and comprises the following steps:
   pre-sorting and re-aligning goods containers by a sorting robot, wherein said goods containers each respectively comprises a base surface having a diagonal, wherein the diagonal of the respective base surfaces extend in a parallel direction to longitudinal axes of a plurality of finger-like conveyor belts;
   detecting the goods containers to be grouped to form a shipment of picked goods with regard to the geometric dimensions, weight and position by a detecting apparatus and supplying the goods containers to a left-hand stacking bridge or to a right-hand stacking bridge;
   pushing the goods containers determined for one layer of goods containers together in the direction of the diagonals of the respective base surface by said plurality of finger-like conveyor belts each having a longitudinal axis, wherein the plurality of finger-like conveyor belts extend in a parallel direction relative to each other, and wherein the conveyor belts are individually extendible, actuatable and are controllable with respect to speed and running direction, as component parts of a stacking bridge, to form one layer of goods containers without any gaps, and wherein the plurality of finger-like conveyor belts are arranged at an angle relative to the totality of the arranged plurality of goods containers;
   lowering the layer of goods containers, grouped in this way, by a lifting apparatus and pushing the layer of goods containers onto an empty pallet by a plurality of conveyor belts which are incorporated in a lifting base; and
   once the layers of goods containers required for a shipment have been grouped together, wrapping the picked goods with a film by a film wrapping apparatus and supplying the picked goods for dispatch by a conveying path,
   wherein the plurality of finger-like conveyor belts of the two stacking bridges to be moved toward one another exert a force on the totality of the goods containers in the longitudinal axis, the force being divided into two force components for pressing the totality of the accumulation of goods containers fixedly together in the centripetal direction, and wherein said pre-alignment step later affects said division of two force components by pressing the totality of the accumulation of goods containers fixedly together in a centripetal direction.

2. The method as claimed in claim 1, wherein the operation of grouping together a layer by a plurality of apparatuses for detecting and scanning goods containers comprises detecting and evaluating in top view in the entire region of the lifting apparatus and of the stacking bridges, wherein the additional movement possibility of the apparatus in the vertical direction creates a surface profile in the manner of a terrain model, formed from the grouping of the surfaces of the goods containers expected to be used.

3. The method according to claim 1, wherein each conveyor belt additionally comprises a respective corresponding connectable primary drive to facilitate the grouping of goods containers, wherein the normal primary drive is made ineffective, and wherein said method further comprises separately modifying the position of each conveyor belt in a controlled manner in the vertical direction by a vertical lifting carriage.

4. The method according to claim 1, further comprising the step of, to form a distributing center, mechanically connecting associated stacking bridges by a bridge gate and supplying associated stacking bridges to one of a plurality of stacking shafts by a pivoting apparatus.

* * * * *

UNITED STATES PATENT AND TRADEMARK OFFICE
CERTIFICATE OF CORRECTION

PATENT NO. : 9,764,909 B2  
APPLICATION NO. : 13/882311  
DATED : September 19, 2017  
INVENTOR(S) : Michael Baumann It is certified that error appears in the above-identified patent and that said Letters Patent is hereby corrected as shown below:

On the Title Page

At item (73) Assignee, the second line:
"Asbach-Baeumenhei (DE)" should read -- Asbach-Baeumenheim (DE) --

Signed and Sealed this
Twenty-sixth Day of June, 2018

Andrei Iancu
*Director of the United States Patent and Trademark Office*